United States Patent [19]
Chui

[11] Patent Number: 5,105,068
[45] Date of Patent: Apr. 14, 1992

[54] POCKET CALCULATOR

[76] Inventor: Hoi-Bui Chui, Flat 606, Block N, Kornhill, Quarry Bay, Hong Kong

[21] Appl. No.: 638,771

[22] Filed: Jan. 8, 1991

[51] Int. Cl.⁵ .............................................. G06C 1/00
[52] U.S. Cl. ...................................... 235/146
[58] Field of Search ................ 235/1 D, 145 R, 146, 235/61 R; 434/201, 307, 308, 323, 335, 336, 364; 273/1 E; D18/6, 7, 11

[56] References Cited

U.S. PATENT DOCUMENTS

| | | | |
|---|---|---|---|
| D. 309,749 | 8/1990 | Ido | D18/7 |
| 4,051,605 | 10/1977 | Toal et al. | 434/201 |
| 4,808,800 | 2/1989 | Nishijima et al. | 235/1 D |
| 4,996,522 | 2/1991 | Sunand | 235/1 D |

Primary Examiner—L. T. Hix
Assistant Examiner—Eddie C. Lee
Attorney, Agent, or Firm—Burns, Doane, Swecker & Mathis

[57] ABSTRACT

A pocket calculator for use by two persons simultaneously comprises two keyboards and four displays so that each user can monitor entries and calculations by the other. The calculator is useful in a variety of situations including financial negotiations, crossing checking of calculation, and in a pupil teacher situation.

3 Claims, 1 Drawing Sheet

U.S. Patent
Apr. 14, 1992
5,105,068
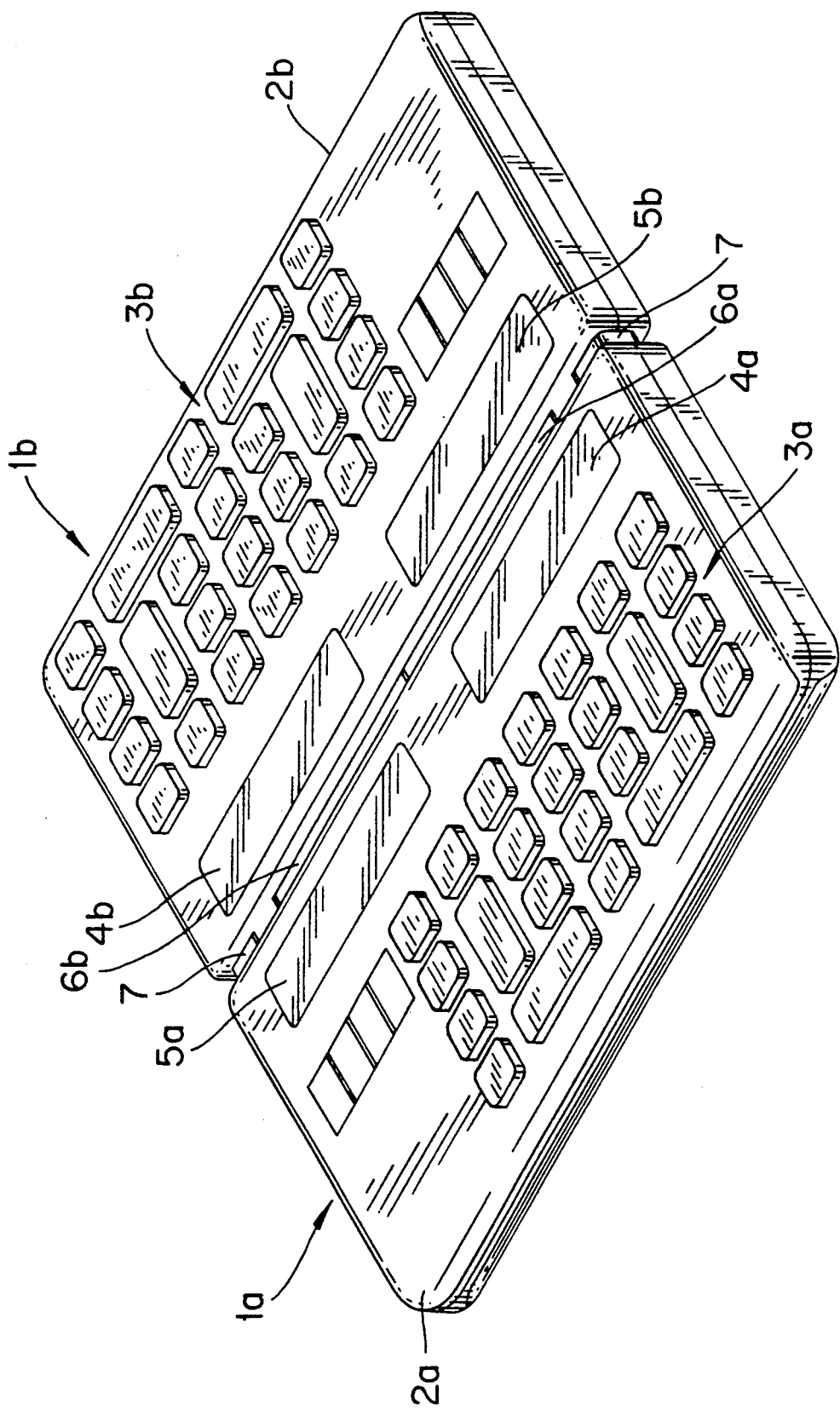

POCKET CALCULATOR

FIELD OF THE INVENTION

The present invention relates to pocket calculators.

SUMMARY OF THE INVENTION

The invention provides a pocket calculator for use by two persons simultaneously, comprising first and second keyboards and first, second, third and fourth displays, the first and second displays being responsive to entries on the first keyboard and being directed towards the first and second users respectively, and the third and fourth displays being responsive to entries on the second keyboard and being directed towards the first and second users respectively.

The pocket calculator according to the invention has numerous uses. The pocket calculator may be used in financial negotiations, with each party entering data and commands which are displayed to both parties simultaneously. The pocket calculator may be used in auditing, in particular for the purpose of cross checking calculations, with entries from a ledger or from invoices being called out and being entered simultaneously by two users each of whom can see the entries and calculations made by the other. The pocket calculator may be used in teaching with the teacher making entries first and the pupil then copying these entries so as to arrive at the same result.

BRIEF DESCRIPTION OF THE DRAWINGS

The drawing shows a perspective view of a pocket calculator according to the invention.

DETAILED DESCRIPTION OF PREFERRED EMBODIMENT

The pocket calculator comprises two modules 1a, 1b each of which is similar to a conventional pocket calculator. Module 1a comprises a housing 2a, a keyboard 3a, and a liquid crystal display 4a, as well as a central processing unit (not shown) and memory (not shown) which are of conventional design and will not be described further. Similarly, module 1b comprises a housing 2b, a keyboard 3b, and a liquid crystal display 4b, as well as a central processing unit (not shown) and memory (not shown) which are of conventional design and will not be described further. The two modules 1a and 1b each comprise an additional liquid crystal display 5a and 5b respectively, with display 5a being responsive to entries made on keyboard 3b and display 5b being responsive to entries made on keyboard 3a. In this way both users of the calculator can view the data and commands entered by the other user and the results of the data and commands. The two modules 1a and 1b are electrically connected to one another by means of a connector 6a from the central processing unit of module 1a to the liquid crystal display 5b and by a connecter 6b from the central processing unit of module 1b to the liquid crystal display 5a. The two modules 1a and 1b are mechanically connected to one another by means of a hinge 7 which allows the two modules to be opened out flat for use as shown in the drawing or folded over into the more compact closed position with the two keyboards 3a, 3b facing one another when not in use.

I claim:

1. A pocket calculator for use by the first user simultaneously, comprising first and second keyboards for use by the first and second users, respectively, and first, second third and fourth dynamic displays, the first and second dynamic displays being responsive to entries on the first keyboard only, and the third and fourth dynamic displays being responsive to entries on the second keyboard only, the first and third dynamic displays being located adjacent to one another and directed towards the first user to allow the first user to view and compare said first and third displays, and the second and fourth dynamic displays being located adjacent to one another and directed towards the second user to allow the second user to view and compare said second and fourth displays.

2. A calculator for simultaneous use by two users, comprising:
   a first calculator module including a processor for performing calculations, a keyboard for entering data into said first processor, and a first display for displaying data entered via said keyboard and results of calculations performed by said processor;
   a second calculator module including a second processor, a keyboard for entering data into the processor of said second calculator module, and a first display for displaying data entered via the keyboard of said second calculator module and results of calculations performed by the processor of said second calculator module;
   said first calculator module further including a second display for displaying data entered via the keyboard of said second calculator module and results of calculations performed by the processor of said second calculator module; and
   said second calculator module further including a second display for displaying data entered via the keyboard of said first calculator module and results of calculations performed by the processor of said first calculator module.

3. The calculator of claim 2 wherein said first and second calculator modules are hingedly connected to one another for pivotal movement between a folded state and an open, operational state.

* * * * *